(12) United States Patent
Yamauchi et al.

(10) Patent No.: US 9,706,470 B2
(45) Date of Patent: Jul. 11, 2017

(54) COMMUNICATIONS APPARATUS, COMMUNICATIONS SYSTEM, AND COMMUNICATIONS METHOD

(71) Applicant: FUJITSU LIMITED, Kawasaki-shi, Kanagawa (JP)

(72) Inventors: Hiromasa Yamauchi, Usakos (NA); Koichiro Yamashita, Hachioji (JP); Takahisa Suzuki, Yokohama (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/668,125

(22) Filed: Mar. 25, 2015

(65) Prior Publication Data
US 2015/0201362 A1 Jul. 16, 2015

Related U.S. Application Data

(63) Continuation of application No. PCT/JP2012/074809, filed on Sep. 26, 2012.

(51) Int. Cl.
*H04W 4/00* (2009.01)
*H04W 40/04* (2009.01)
(Continued)

(52) U.S. Cl.
CPC .............. *H04W 40/04* (2013.01); *H04B 7/15* (2013.01); *H04W 24/08* (2013.01); *H04W 40/02* (2013.01);
(Continued)

(58) Field of Classification Search
CPC ................................ H04W 40/04; H04B 7/15
(Continued)

(56) References Cited

U.S. PATENT DOCUMENTS

2004/0095920 A1* 5/2004 Lippman .................. H04L 1/18
370/351
2004/0266339 A1* 12/2004 Larsson ................. H04B 7/022
455/7
(Continued)

FOREIGN PATENT DOCUMENTS

CN 1645938 7/2005
JP 2007-116477 5/2007
(Continued)

OTHER PUBLICATIONS

International Search Report mailed Nov. 27, 2012 in corresponding international application PCT/JP2012/074809.
(Continued)

*Primary Examiner* — Samina Choudhry
(74) *Attorney, Agent, or Firm* — Staas & Halsey LLP

(57) ABSTRACT

A communications apparatus includes a reception signal processor that receives a wireless signal; a processor that controls a wait time that the reception signal processor waits for reception of wireless signals that include data to be transmitted and information of transmission paths; extracts from the information of the transmission paths included in the wireless signals received by the reception signal processor during the wait time, information of a common relay point in the transmission paths; determines a network state according to a ratio of transmission paths that include the common relay point, among a total count of the transmission paths; and generates based on the determined network state, a signal that includes information of a relay point; and a transmission signal processor that transmits the generated signal.

11 Claims, 15 Drawing Sheets

(51) Int. Cl.
*H04W 40/24* (2009.01)
*H04W 84/18* (2009.01)
*H04W 40/02* (2009.01)
*H04B 7/15* (2006.01)
*H04W 24/08* (2009.01)

(52) U.S. Cl.
CPC .......... *H04W 40/24* (2013.01); *H04W 84/18* (2013.01); *Y02B 60/50* (2013.01)

(58) Field of Classification Search
USPC ........................................................ 370/329
See application file for complete search history.

(56) References Cited

U.S. PATENT DOCUMENTS

| | | | |
|---|---|---|---|
| 2005/0074019 A1* | 4/2005 | Handforth ............... | H04L 12/44 370/406 |
| 2008/0037623 A1* | 2/2008 | Abou Rjeily ........ | H04B 1/7176 375/239 |
| 2008/0112371 A1 | 5/2008 | Joshi et al. | |
| 2008/0274692 A1* | 11/2008 | Larsson ............. | H04B 7/15592 455/24 |
| 2009/0040039 A1 | 2/2009 | Kaneko et al. | |
| 2009/0257386 A1* | 10/2009 | Achir ...................... | H04L 25/14 370/329 |
| 2010/0157826 A1* | 6/2010 | Yu .......................... | H04B 7/155 370/252 |
| 2011/0064066 A1* | 3/2011 | Lamba ................. | H04B 1/7107 370/342 |
| 2011/0176416 A1 | 7/2011 | Bhatti et al. | |
| 2013/0029590 A1* | 1/2013 | Hu .......................... | H04L 1/007 455/7 |
| 2013/0229911 A1 | 9/2013 | Nagata et al. | |
| 2013/0336152 A1* | 12/2013 | Zhu ........................ | H04B 15/00 370/252 |

FOREIGN PATENT DOCUMENTS

| | | |
|---|---|---|
| JP | 2007-306280 | 11/2007 |
| JP | 2009-042928 | 2/2009 |
| JP | 2009-253359 | 10/2009 |
| JP | 2010-011103 | 1/2010 |
| JP | 2010-045701 | 2/2010 |
| JP | 2011-004096 | 1/2011 |
| WO | WO 2012/073315 A1 | 6/2012 |

OTHER PUBLICATIONS

Mika Ishizuka and Masaki Aida "Stochastic Node Placement Improving Fault Tolerance in Wireless Sensor Networks", Nov. 1, 2005; vol. J88-B No. 11, p. 2181-2191.

Yuichi Kiri et al. "Differences between Centralized Control and Self-Organized Control in Robustness of Sensor Networks", The Institute of Electronics, Information and Communication Engineers; Technical Report of IEICE., Jul. 12, 2007, p. 1-6.

Japanese Office Action dated Feb. 2, 2016 in corresponding Japanese Patent Application No. 2014-537937.

Taiwanese Office Action dated Mar. 24, 2015 in corresponding Taiwanese Patent Application No. 102123139.

* cited by examiner

FIG.7

| | TRANSMISSION PATH DIAGRAM | TRANSMISSION PATH | NODE ID | APPEARANCE RATE OF NODES, EXCLUDING NODES 1 AND 9 |
|---|---|---|---|---|
| NO FAULTY NODE PRESENT | | ——— 1,2,3,6,9<br>- - - - 1,2,5,6,9<br>- · - · 1,4,7,8,9<br>- ·· - ·· 1,4,5,8,9 | 2 | 50% |
| | | | 3 | 25% |
| | | | 4 | 50% |
| | | | 5 | 50% |
| | | | 6 | 50% |
| | | | 7 | 25% |
| | | | 8 | 50% |
| NODE 3 FAULTY | | - - - - 1,2,5,6,9<br>- · - · 1,4,7,8,9<br>- ·· - ·· 1,4,5,8,9 | 2 | 33% |
| | | | 3 | 0% |
| | | | 4 | 66% |
| | | | 5 | 66% |
| | | | 6 | 33% |
| | | | 7 | 33% |
| | | | 8 | 66% |
| NODE 4 ALSO FAULTY | | - - - - 1,2,5,6,9<br>·········· 1,2,5,8,9 | 2 | 100% |
| | | | 3 | 0% |
| | | | 4 | 0% |
| | | | 5 | 100% |
| | | | 6 | 50% |
| | | | 7 | 0% |
| | | | 8 | 50% |

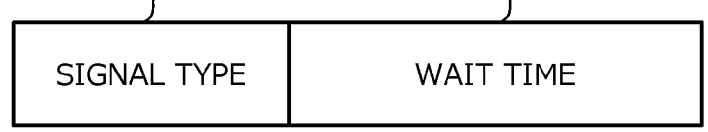
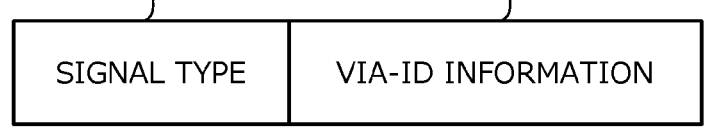
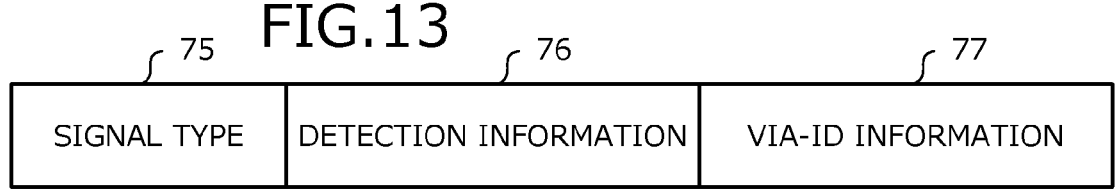

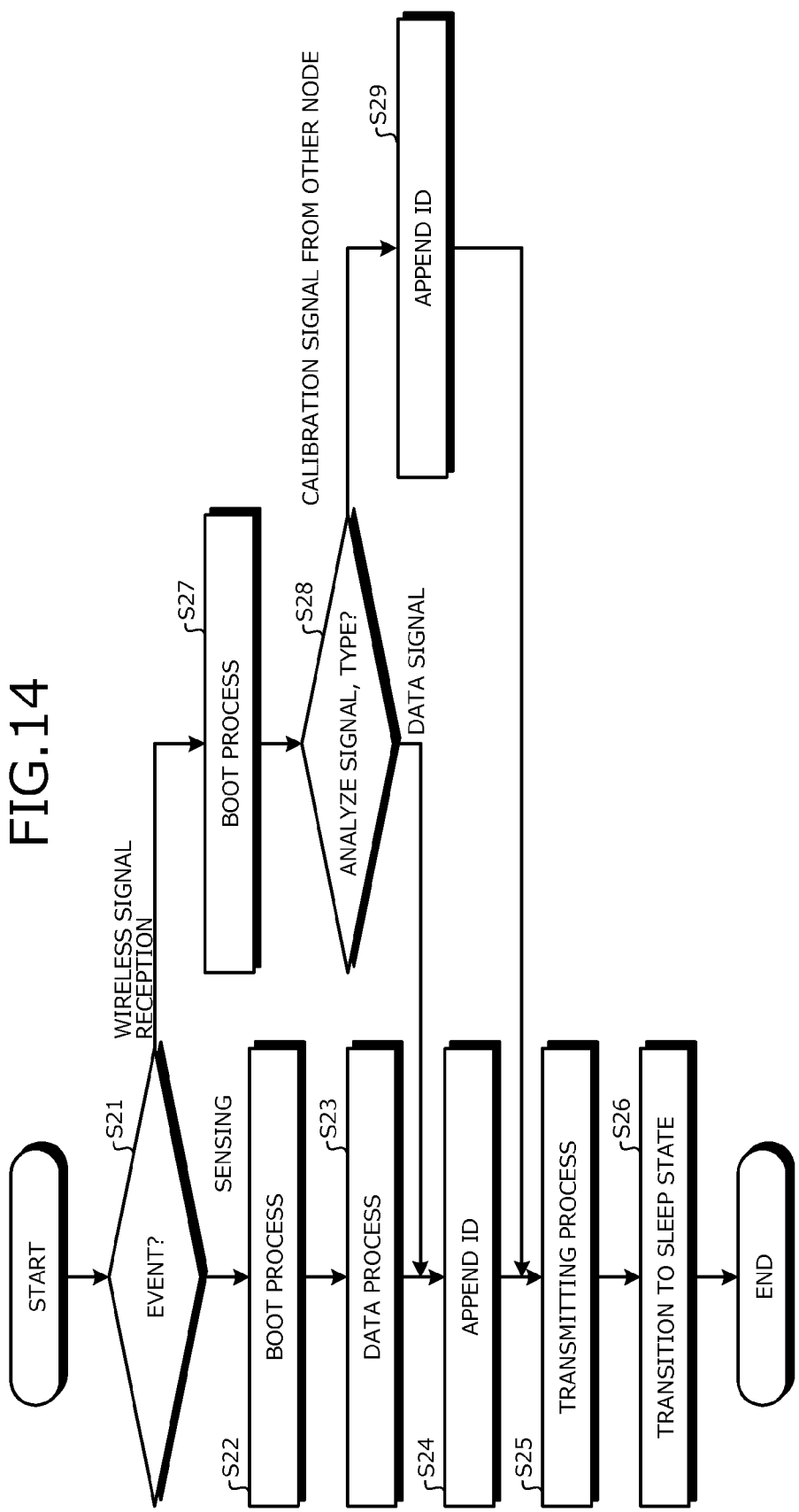

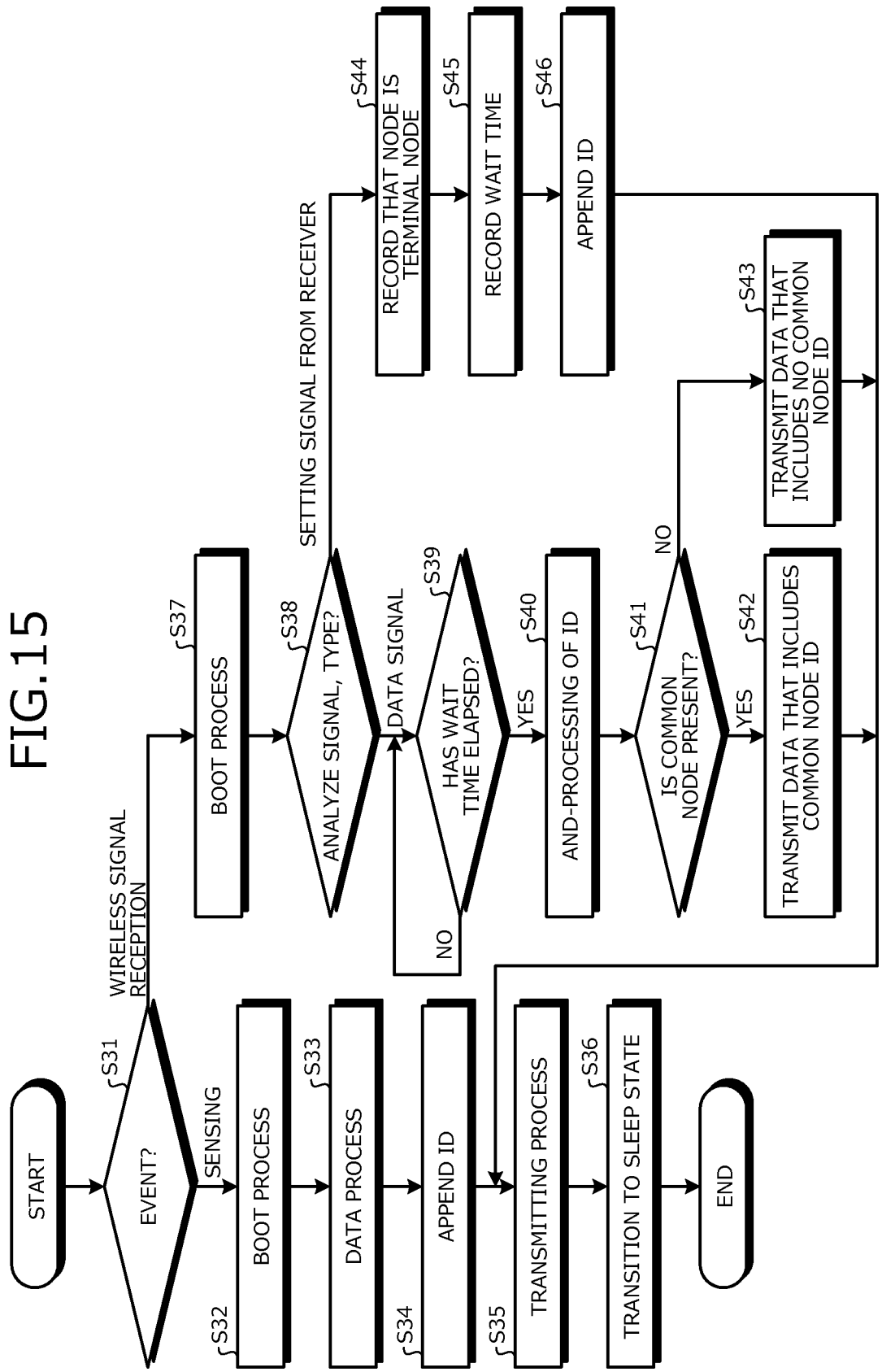

COMMUNICATIONS APPARATUS, COMMUNICATIONS SYSTEM, AND COMMUNICATIONS METHOD

CROSS REFERENCE TO RELATED APPLICATIONS

This application is a continuation application of International Application PCT/JP2012/074809, filed on Sep. 26, 2012 and designating the U.S., the entire contents of which are incorporated herein by reference.

FIELD

The embodiments discussed herein are related to a communications apparatus, a communications system, and a communications method.

BACKGROUND

According to a conventional technique, by forming between a communications apparatus that transmits data and a communications apparatus that receives the data, plural transmission paths that sequentially relay the data via plural relay apparatuses, the arrival rate of the data is improved (for example, refer to Japanese Laid-Open Patent Publication No. 2010-11103). Further, according to another technique, the placement of communications apparatuses is adjusted such that plural routes are established between all communications apparatuses having a function of mutually relaying communications (for example, refer to Japanese Laid-Open Patent Publication No. 2010-45701). According to yet another technique, in a wireless multi-hop network, by presenting the distance to a node based on the hop count to the node, the installation position of the node is narrowed down (for example, refer to Japanese Laid-Open Patent Publication No. 2007-306280).

Among sensor network technologies, an arrangement has been proposed that is related to the placement of plural sensor nodes and that has high fault-tolerance (for example, refer to Mika ISHIZUKA, et al, "Stochastic Node Placement Improving Fault Tolerance in Wireless Sensor Networks", Institute of Electronics, Information and Communication, Journal B, Japan, Nov. 1, 2005, Vol. J88-B, No. 11, pp. 2181-2191). According to another technology, the failure of a sensor node is detected by the transmission and reception of messages between sensor nodes (for example, refer to Yuichi KIRI, et al, "Differences between Centralized Control and Self-Organized Control in Robustness of Sensor Networks", Institute of Electronics, Information and Communication, Technological Research Report, Network System, Japan, Jul. 12, 2007, Vol. 107, No. 146, pp. 1-6).

Plural transmission paths may pass through the same relay apparatus. If the relaying operation of a relay apparatus common to plural transmission paths is suspended consequent to a fault, battery exhaustion, etc., the transmission paths passing through this common relay apparatus become disconnected. If a relay apparatus is common to all of transmission paths and if this common relay apparatus suspends relaying operation, all of the transmission paths become disconnected and data cannot be transmitted. In other words, the wireless multi-hop network enters a non-functional state.

To prevent the wireless multi-hop network from entering a non-functional state, it is important to prevent a risky state in which all transmission paths transmit data through the same relay apparatus. Nonetheless, with conventional wireless multi-hop network technology, such a risky state in which all transmission paths transmit data through the same relay apparatus cannot be detected during operation of the network.

SUMMARY

According to an aspect of an embodiment, a communications apparatus includes a reception signal processor that receives a wireless signal; a processor that controls a wait time that the reception signal processor waits for reception of wireless signals that include data to be transmitted and information of transmission paths; extracts from the information of the transmission paths included in the wireless signals received by the reception signal processor during the wait time, information of a common relay point in the transmission paths; determines a network state according to a ratio of transmission paths that include the common relay point, among a total count of the transmission paths; and generates based on the determined network state, a signal that includes information of a relay point; and a transmission signal processor that transmits the generated signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram depicting an example of a case in which plural levels of a risky state of a network are set;

FIG. 11 is a diagram depicting an example of a data format of a setting signal sent from a receiver to a second communications apparatus;

FIG. 12 is a diagram depicting an example of a data format of a calibration command signal from another node;

FIG. 13 is a diagram depicting an example of a data format of a sensing data signal;

FIG. 14 is a diagram (part 1) depicting another example of the communications method according to the embodiment;

FIG. 15 is a diagram (part 2) depicting another example of the communications method according to the embodiment;

DESCRIPTION OF EMBODIMENTS

Figure 1:
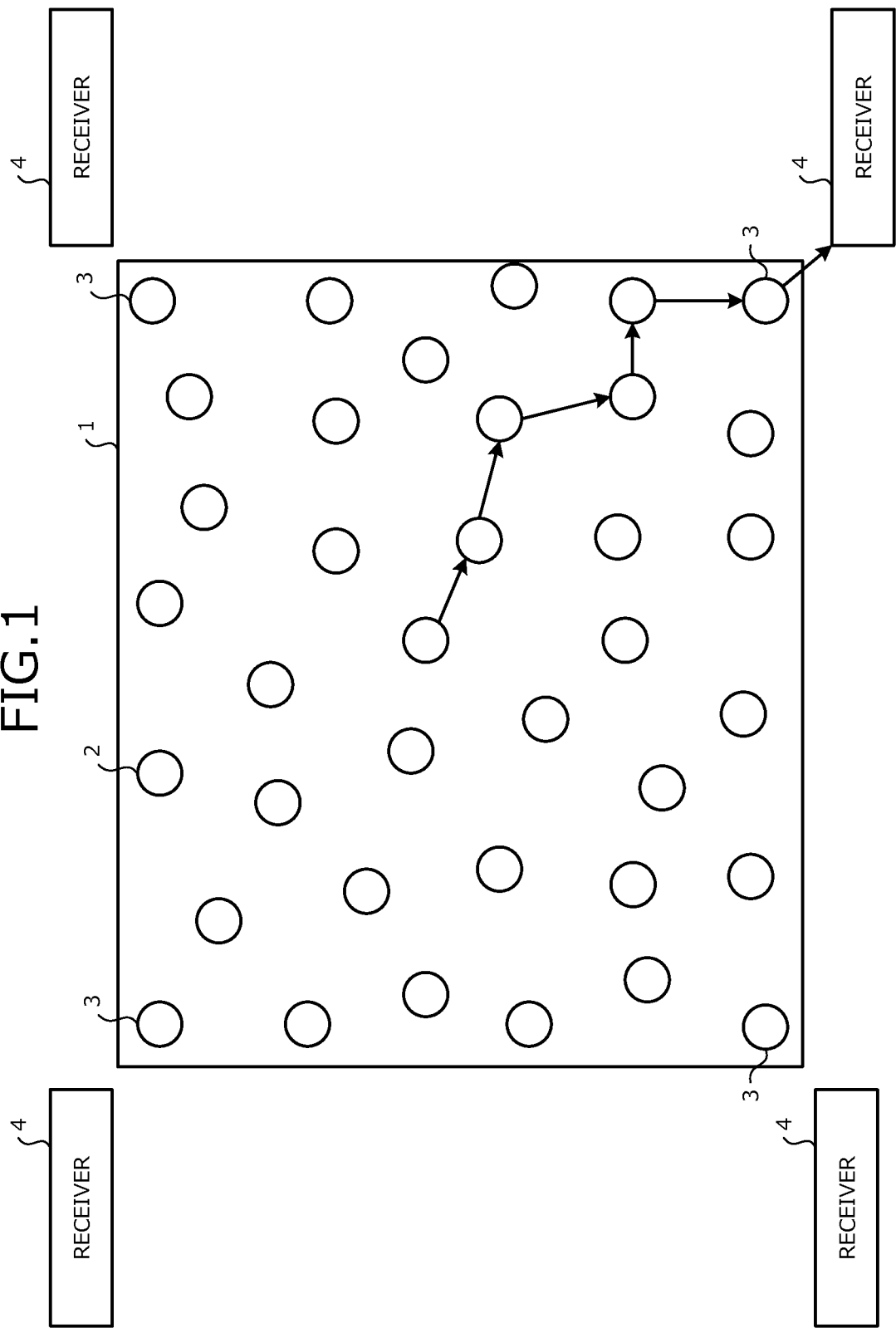
FIG. 1 is a diagram depicting an example of a communications system according to an embodiment.

Embodiments of a communications apparatus, a communications system, and a communications method will be described in detail with reference to the accompanying drawings. In the description of the embodiments, identical constituent elements will be given the same reference numerals and redundant description thereof will be omitted. Furthermore, the present invention is not limited by the following embodiments.

FIG. 1 is a diagram depicting an example of the communications system according to an embodiment. In FIG. 1, circles ○ are communications apparatuses. As depicted in FIG. 1, for example, the communications system includes first communications apparatuses 2 interspersed in a given area 1 and a second communications apparatus 3 present in one or more corners of the area 1. The first communications apparatuses 2 may be uniformly present in the area 1. Further, outside one or more corners of the area 1, a receiver 4 may be provided near the second communications apparatus 3 in the corner.

In the example depicted in FIG. 1, although the area 1 is of a rectangular shape, the shape is not limited hereto. Further, in the example depicted in FIG. 1, although a total of four receivers 4, one in each of the four corners of the area 1, are provided, a single receiver 4 may be provided in just one corner of the area 1; or a receiver 4 may be provided in respectively in 2, 3, 5 or more corners.

If another first communications apparatus 2 is immediately nearby, or a second communications apparatus 3 is nearby, without specifying a transmission destination, a given first communications apparatus 2 broadcasts a wireless signal at an output level enabling the wireless signal to reach the nearby second communications apparatus 3. Without specifying a transmission destination, the second communications apparatus 3 broadcasts a wireless signal at an output level enabling the wireless signal to reach the nearest receiver 4. If the installation position of the second communications apparatus 3 is fixed, the second communications apparatus 3 may specify the nearest receiver 4 as the transmission destination and transmit the wireless signal.

The given first communications apparatus 2 and the other first communications apparatus 2 are wirelessly connected by ad hoc communication, whereby data that is to be transmitted and included in the wireless signal broadcasted from the given first communications apparatus 2 is transmitted to the other first communications apparatus 2. The first communications apparatuses 2 and the second communications apparatus 3 are wirelessly connected by ad hoc communication, whereby the data that is to be transmitted and included in the wireless signal broadcast from a first communications apparatus 2 is transmitted to the second communications apparatus 3.

The second communications apparatus 3 and the receiver 4 are wirelessly connected by ad hoc communication, whereby data that is to be transmitted and included in the wireless signal from the second communications apparatus 3 is transmitted to the receiver 4. Accordingly, data that is to be transmitted and included in a wireless signal broadcast from any one of the first communications apparatuses 2, for example, as indicated by arrows in FIG. 1, is sequentially relayed by other first communications apparatuses 2 and transmitted to the second communications apparatus 3.

The data that is to be transmitted and that is received by the second communications apparatus 3 is relayed by the second communications apparatus 3 and transmitted to the receiver 4. In other words, in the communications system according to the embodiment, a wireless multi-hop network is built in the area 1 by the first communications apparatuses 2 and the second communications apparatuses 3.

When a first communications apparatus 2 broadcasts a wireless signal that includes data to be transmitted, the first communications apparatus 2 appends to the data to be transmitted, unique information that is specific to the first communications apparatus 2. Accordingly, the wireless signal broadcast from the first communications apparatus 2 and received by the second communications apparatus 3 includes the data to be transmitted and information of the transmission path of this data. Inclusion of the information of the transmission path in the wireless signal received by the second communications apparatus 3 enables the second communications apparatus 3 to obtain the unique information specific to the first communications apparatuses 2 that relay the data to the second communications apparatus 3.

Figure 2:
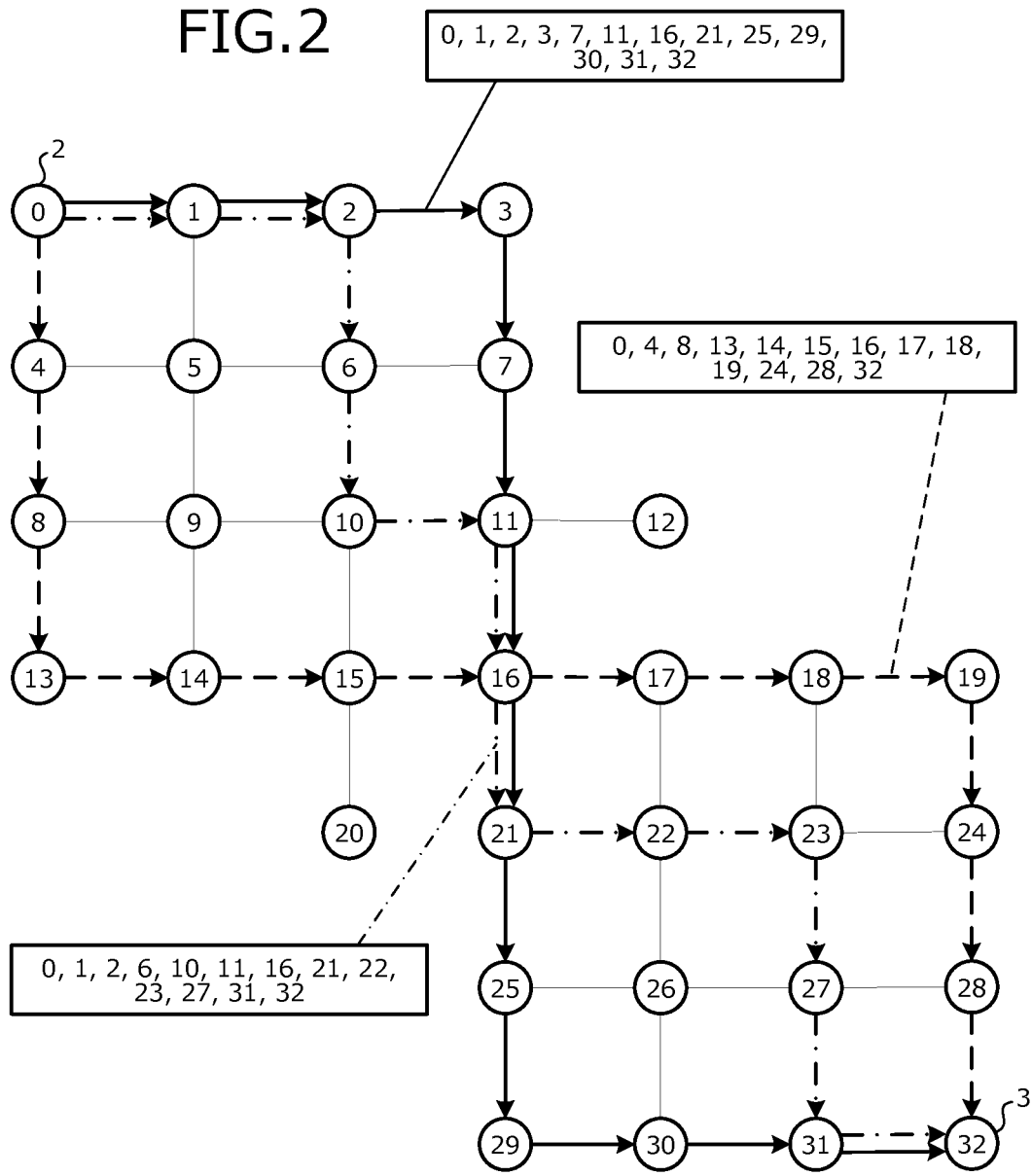
FIG. 2 is a diagram depicting an example of a transmission path in the communications system according to the embodiment.

FIG. 2 is a diagram depicting an example of a transmission path in the communications system according to the embodiment. In FIG. 2, circles ○ are communications apparatuses, and a numeral inside a circle ○ is the unique information identifying the communications apparatus. This unique information may be referred to as an ID. Further, the communications apparatuses may be referred to as nodes. Accordingly, a numeral inside a circle ○ represents the ID of a node.

For example, nodes whose respective IDs are 0 to 31 are first communications apparatuses 2. A node whose ID is 0 generates data to be transmitted, includes the generated data in a wireless signal, and is the first to broadcast the wireless signal. For example, a node whose ID is 32 is the second communications apparatus 3. The second communications apparatus 3 is the last node to receive the data to be transmitted. Accordingly, in the description hereinafter, a node of the second communications apparatus 3 may be referred to a terminal node.

For example, as depicted in FIG. 2, data that is to be transmitted and that is broadcast from the node whose ID is 0 may pass through plural transmission paths to reach a terminal node whose ID is 32, as indicated by a transmission path indicated by a solid line, a transmission path indicated by a dashed line, and a transmission path indicated by a dot-dashed line. For example, in the transmission path indicated by the solid line, the data sequentially passes through the nodes whose respective IDs are 1, 2, 3, 7, 11, 16, 21, 25, 29, 30, and 31 to reach the node whose ID is 32, from the node whose ID is 0.

For example, in the transmission path indicated by the dashed line, the data sequentially passes through the nodes whose respective IDs are 4, 8, 13, 14, 15, 16, 17, 18, 19, 24, and 28 to reach the node whose ID is 32, from the node whose ID is 0. Further, for example, in the transmission path indicated by the dot-dashed line, the data sequentially passes through the nodes whose respective IDs are 1, 2, 6, 10, 11,

16, 21, 22, 23, 27, and 31 to reach the node whose ID is 32, from the node whose ID is 0.

In the example depicted in FIG. 2, excluding the head node whose ID is 0 and the terminal node whose ID is 32, the three transmission paths each pass through the node whose ID is 16. In other words, the node whose ID is 16 is a node common to the three transmission paths. In a case where, for example, consequent to a failure or power cut, the common node whose ID is 16 cannot receive a wireless signal to be relayed, or cannot broadcast a wireless signal to be relayed, the data that is to be transmitted does not reach the terminal node whose ID is 32.

Therefore, a state in which a common node is present on plural transmission paths, is a risky state in which the wireless multi-hop network has a possibility of becoming non-functional in the future. Moreover, when a common node is present on plural transmission paths, a warning notifying the person that manages and maintains the communications system is desirable.

Figure 3:
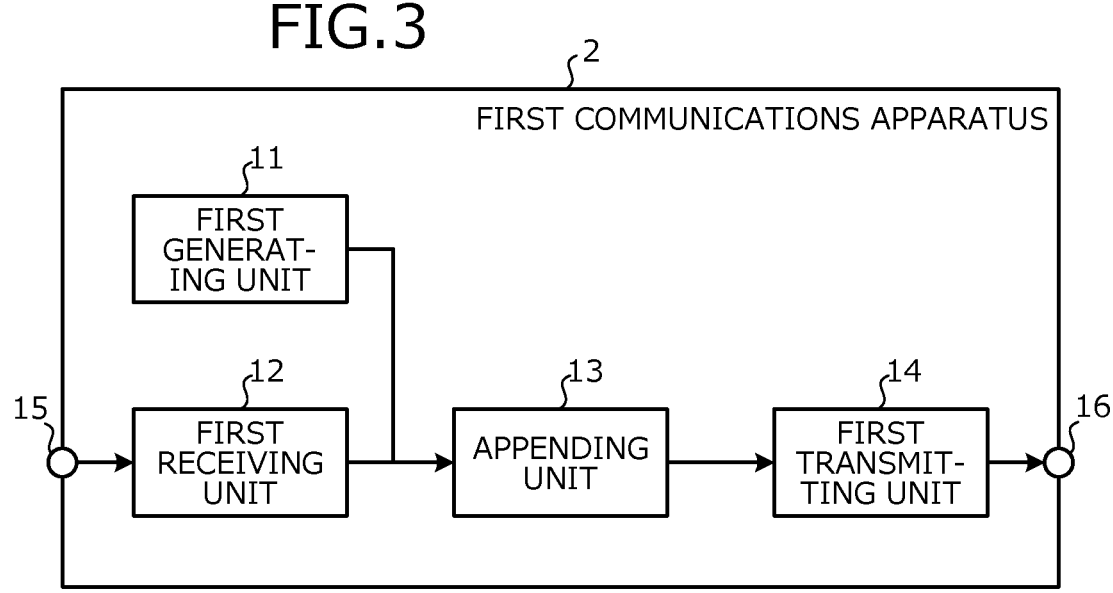
FIG. 3 is a diagram depicting an example of a communications apparatus according to the embodiment.

FIG. 3 is a diagram depicting an example of the communications apparatus according to the embodiment. The communications apparatus depicted in FIG. 3 is an example of the first communications apparatus 2 in the communications system depicted in FIG. 1. As depicted in FIG. 3, the first communications apparatus 2 has a first generating unit 11, a first receiving unit 12, an appending unit 13, and a first transmitting unit 14.

The first generating unit 11 generates data to be transmitted. The first receiving unit 12 receives wireless signals input from a non-depicted antenna connected to an input terminal 15. The wireless signals received by the first receiving unit 1 may include data that is to be transmitted and generated by another first communications apparatus 2, and information of the transmission path of this data to be transmitted.

When the first generating unit 11 generates the data to be transmitted, the appending unit 13 appends the ID of the node thereof to the data generated by the first generating unit 11. If the first receiving unit 12 receives a wireless signal that includes data that is to be transmitted and information of the transmission path, the appending unit 13 appends the ID of the node thereof to the information of the transmission path. The first transmitting unit 14 broadcasts from a non-depicted antenna connected to an output terminal 16, a wireless signal that includes the data to be transmitted and information of a transmission path that includes the ID of the node of the first transmitting unit 14.

Figure 4:
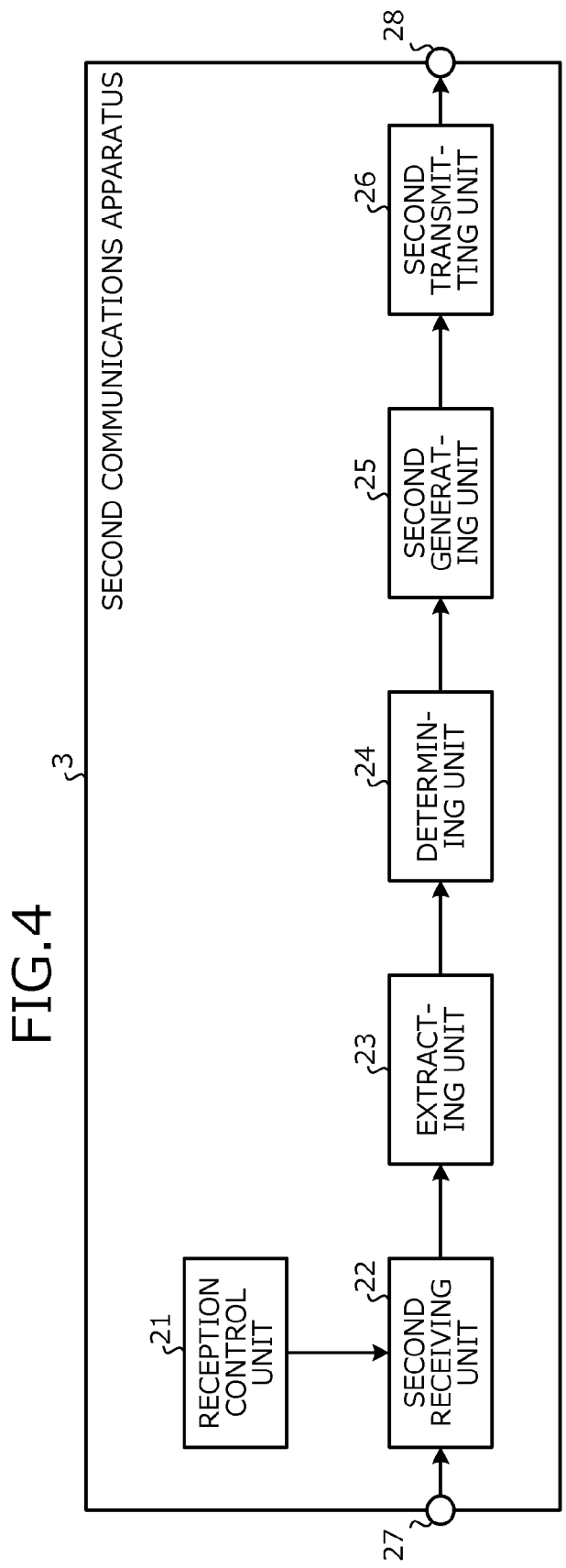
FIG. 4 is a diagram depicting another example of the communications apparatus according to the embodiment.

FIG. 4 is a diagram depicting another example of the communications apparatus according to the embodiment. The communications apparatus depicted in FIG. 4 is an example of the second communications apparatus 3 in the communications system depicted in FIG. 1. As depicted in FIG. 4, the second communications apparatus 3 has a reception control unit 21, a second receiving unit 22, an extracting unit 23, a determining unit 24, a second generating unit 25, and a second transmitting unit 26.

The second receiving unit 22 receives wireless signals input from a non-depicted antenna connected to an input terminal 27. The wireless signals received by the second receiving unit 22 may include data that is generated by a first communications apparatus 2 and is to be transmitted, and information of the transmission path of this data to be transmitted.

The reception control unit 21 controls a wait time for waiting for the second receiving unit 22 to receive wireless signals that include data to be transmitted and information of the transmission path. The wait time may be a period based on the difference of the distances of the transmission paths included in the wireless signals received by the second receiving unit 22.

In the example depicted in FIG. 2, data that has passed through the transmission path indicated by the solid line is assumed to first reach the terminal node whose ID is 32, from the head node whose ID is 0. A period of time that if waited for after the data first reaches this terminal node, marks the time by which the data that is to be transmitted can be expected to reach the terminal node at the very latest, via the transmission path indicated by the dashed line or the transmission path indicated by the dot-dashed line may be used as the wait time. By setting the wait time in such a manner, the second communications apparatus 3 can receive data transmitted from the same head node, through plural transmission paths.

The extracting unit 23 extracts the ID of a node that is common to plural paths, from the information of the transmission path included in the wireless signals received by the second receiving unit 22 during the wait time. The determining unit 24 determines the state of the network according to the ratio of transmission paths that include the common node, among a total count of the transmission paths included in the wireless signals received by the second receiving unit 22 during the wait time.

The second generating unit 25 generates a signal that includes the ID of the common node, based on a determination result obtained by the determining unit 24. For example, as depicted in the example depicted in FIG. 2, the second generating unit 25 may generate a signal that includes the ID of a common node, when a common node is present in plural transmission paths. The second transmitting unit 26 broadcasts the wireless signal that includes the ID of a common node, from a non-depicted antenna connected to an output terminal 28.

Figure 5:
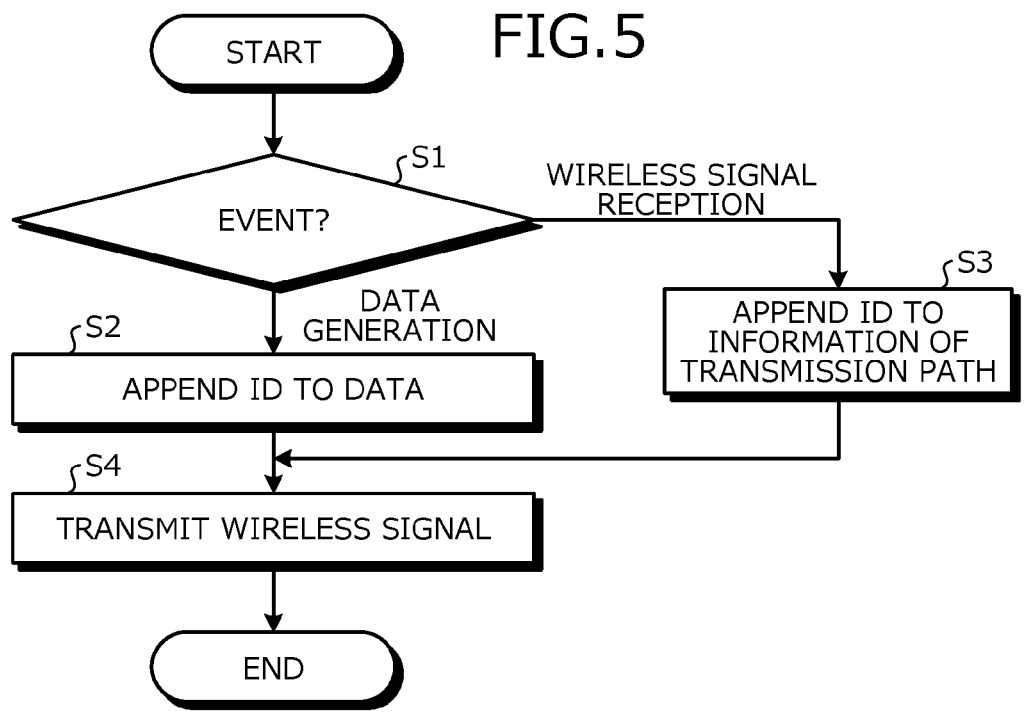
FIG. 5 is a diagram depicting an example of a communications method according to the embodiment.

FIG. 5 is a diagram depicting an example of the communications method according to the embodiment. The communications method depicted in FIG. 5, for example, may be performed by the first communications apparatus 2 depicted in FIG. 3. In the present embodiment, description will be given in which the first communications apparatus 2 depicted in FIG. 3 performs the communications method.

As depicted in FIG. 5, at the first communications apparatus 2, if an event occurs of the first generating unit 11 generating data to be transmitted (step S1: data generation), the appending unit 13 appends the ID of the node thereof to the data generated by the first generating unit 11 (step S2). The first transmitting unit 14, without specifying a transmission destination, broadcasts a wireless signal that includes ID of the node thereof and the generated data (step S4).

On the other hand, at the first communications apparatus 2, if an event occurs of the first receiving unit 12 receiving a wireless signal (step S1: wireless signal reception), the appending unit 13 appends the ID of the node thereof to the information of the transmission path included in the wireless signal (step S3). The first transmitting unit 14, without specifying a transmission destination, broadcasts a wireless signal that includes the data included in the wireless signal received by the first receiving unit 12, and the information of the transmission path and to which the ID of the node thereof has been appended (step S4), and thereafter, the first communications apparatus 2 ends the series of operations.

Figure 6:
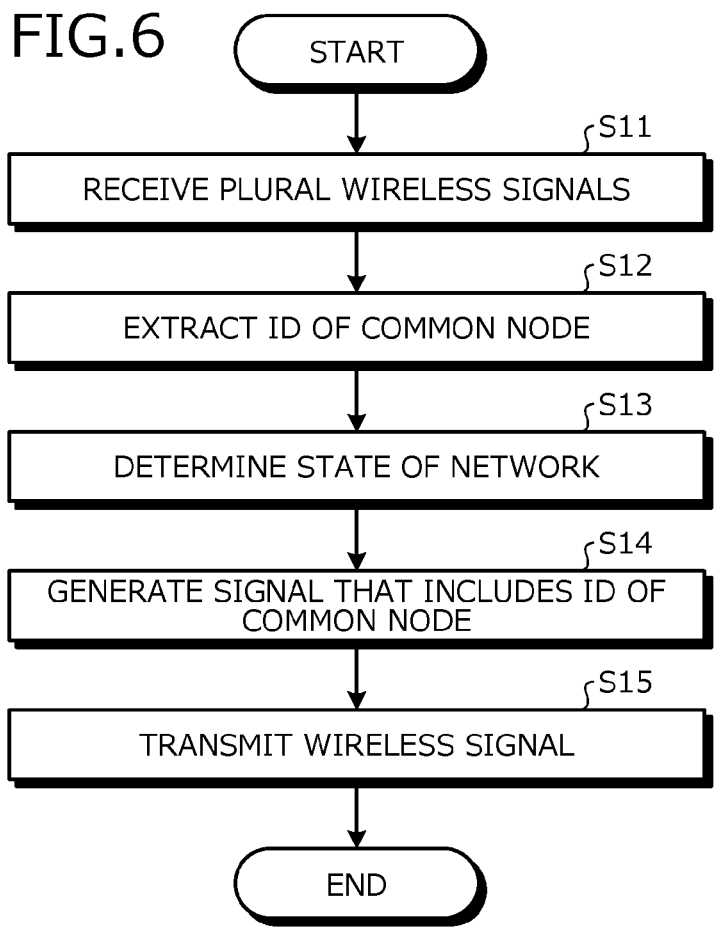
FIG. 6 is a diagram depicting another example of the communications method according to the embodiment.

FIG. 6 is a diagram depicting another example of the communications method according to the embodiment. The communications method depicted in FIG. 6, for example, may be performed by the second communications apparatus 3 depicted in FIG. 4. In the present embodiment, description will be given in which the second communications apparatus 3 depicted in FIG. 4 performs the communications method.

As depicted in FIG. 6, in the second communications apparatus 3, during the wait time controlled by the reception control unit 21, the second receiving unit 22 receives wireless signals from one or more of the first communications apparatuses 2 (step S11). When the wait time elapses, the extracting unit 23 extracts the ID of a node common to plural transmission paths, from the information of the transmission paths included in the wireless signals received by the second receiving unit 22 (step S12).

The determining unit 24 determines the state of the network based on an appearance rate of the ID of the common node (step S13). The appearance rate of the ID of a common node is the ratio of transmission paths that include the ID of the common node, among a total count of the transmission paths included in the wireless signals received during wait time by the second receiving unit 22.

For example, if the ID of the same node is included in all of the transmission paths included in the wireless signals received by the second receiving unit 22 during the wait time, i.e., the appearance rate of the ID of a common node is 100%, the determining unit 24 may determine that the network is in a risky state. Further, multiple levels of a risky state of the network may be provided. For example, when the appearance rate of the ID of the common node is a first threshold or greater, the determining unit 24 may determine that caution is necessary, and if appearance rate is a second threshold or greater, the determining unit 24 may determine that the network is in a risky state. By providing such thresholds and by comparing the appearance rate of the ID of the common node to the thresholds, the state of the network can be easily determined.

The second generating unit 25 generates a signal that includes the ID of the common node, based on a determination result obtained by the determining unit 24 (step S14). For example, if the appearance rate of the ID of a common node is 100% and the network is determined to be in a risky state by the determining unit 24, the signal generated by the second generating unit 25 may include the data included in the wireless signals received by the second receiving unit 22 and the ID of the common node.

Further, if plural levels of a risky state of the network are provided, the signal generated by the second generating unit 25 may include the data included in the wireless signals received by the second receiving unit 22, the ID of the common node, and the level of the risky state. Further, for example, if the network is determined to not be in a risky state by the determining unit 24, the signal generated by the second generating unit 25 suffices to include the data included in the wireless signals received by the second receiving unit 22.

The second transmitting unit 26, without specifying a transmission destination, broadcasts the wireless signal generated by the second generating unit 25 (step S15). Alternatively, the second transmitting unit 26 may specify the nearest receiver 4 as the transmission destination and transit the generated wireless signal. Thereafter, the second communications apparatus 3 ends the series of operations.

FIG. 7 is a diagram depicting an example of a case in which plural levels of a risky state of the network are set. As depicted in an upper portion of a chart depicted in FIG. 7, for example, when no node is present that is unable to transmit or receive a wireless signal consequent to a failure or power cut, four transmission paths are assumed to be present from the node whose ID is 1 to the node whose ID is 9.

In this case, the appearance rate of the nodes, excluding the nodes whose IDs are 1 and 9 respectively, for example, is 25% or 50%. For example, if the first threshold and the second threshold are greater than 50%, the determining unit 24 of the second communications apparatus 3 may determine that the network is not in a risky state.

In this state, as depicted in a central portion of the chart depicted in FIG. 7, for example, the node whose ID is 3 is assumed to enter a state in which the node is unable to transmit or receive a wireless signal consequent to a failure or power cut. In this case, for example, the appearance rate of the nodes whose ID is 4, 5, or 8, is 66%. For example, if the first threshold is 66% and the second threshold is greater than 66%, the determining unit 24 may determine that caution is necessary.

In this state, as depicted in a lower portion of the chart depicted in FIG. 7, for example, the node whose ID is 4 is assumed to enter a state in which the node is unable to transmit or receive a wireless signal consequent to a failure or power cut. In this case, for example, the appearance rate of the nodes whose ID is 2 or 5 is 100%. For example, if the second threshold is 100%, the determining unit 24 may determine that the network is in a risky state.

In this manner, the issuance of a stepwise alarm concerning the state of the network based on the appearance rate of the ID of a common node enables countermeasures to be taken, such as newly providing a node to establish an alternative transmission path, at a stage when caution is necessary, before the network enters a risky state. In other words, the network can be prevented from entering a risky state. Therefore, a more reliable wireless multi-hop network is built, enabling the wireless multi-hop network to be operated more stably.

According to the communications apparatus depicted in FIG. 3 or the communications method depicted in FIG. 5, each time data that is to be transmitted is generated or relayed, the ID of the apparatus that generated the data or the ID of the apparatus that relayed the data is appended to the information of the transmission path. Therefore, the ID of the communications apparatuses that relay the data can be provided to an apparatus that determines whether the network is in a risky state based on, for example, the information of the transmission path. For example, consequent to providing the information of the transmission path to the communications apparatus depicted in FIG. 4 whereby the communications apparatus depicted in FIG. 4 determines whether the network is in a risky state based on the information of the transmission path, it can be detected that the transmission paths in the wireless multi-hop network are is in a risky state.

According to the communications apparatus depicted in FIG. 4 or the communications method depicted in FIG. 6, by including in the information of the transmission path, the IDs of the communications apparatuses that relay the data, a common ID can be extracted from the information of the transmission paths for the data. Based on whether a common ID is present, whether the network is in a risky state can be determined. Therefore, it can be detected that the transmission paths in the wireless multi-hop network are in a risky state.

According to the communications system depicted in FIG. 1, the communications apparatus depicted in FIG. 3 and the communications apparatus depicted in FIG. 4 perform the communications method depicted in FIG. 5 and the communications method depicted in FIG. 6 whereby, it can be detected that the transmission paths in the wireless multi-hop network are in a risky state.

Figure 8:
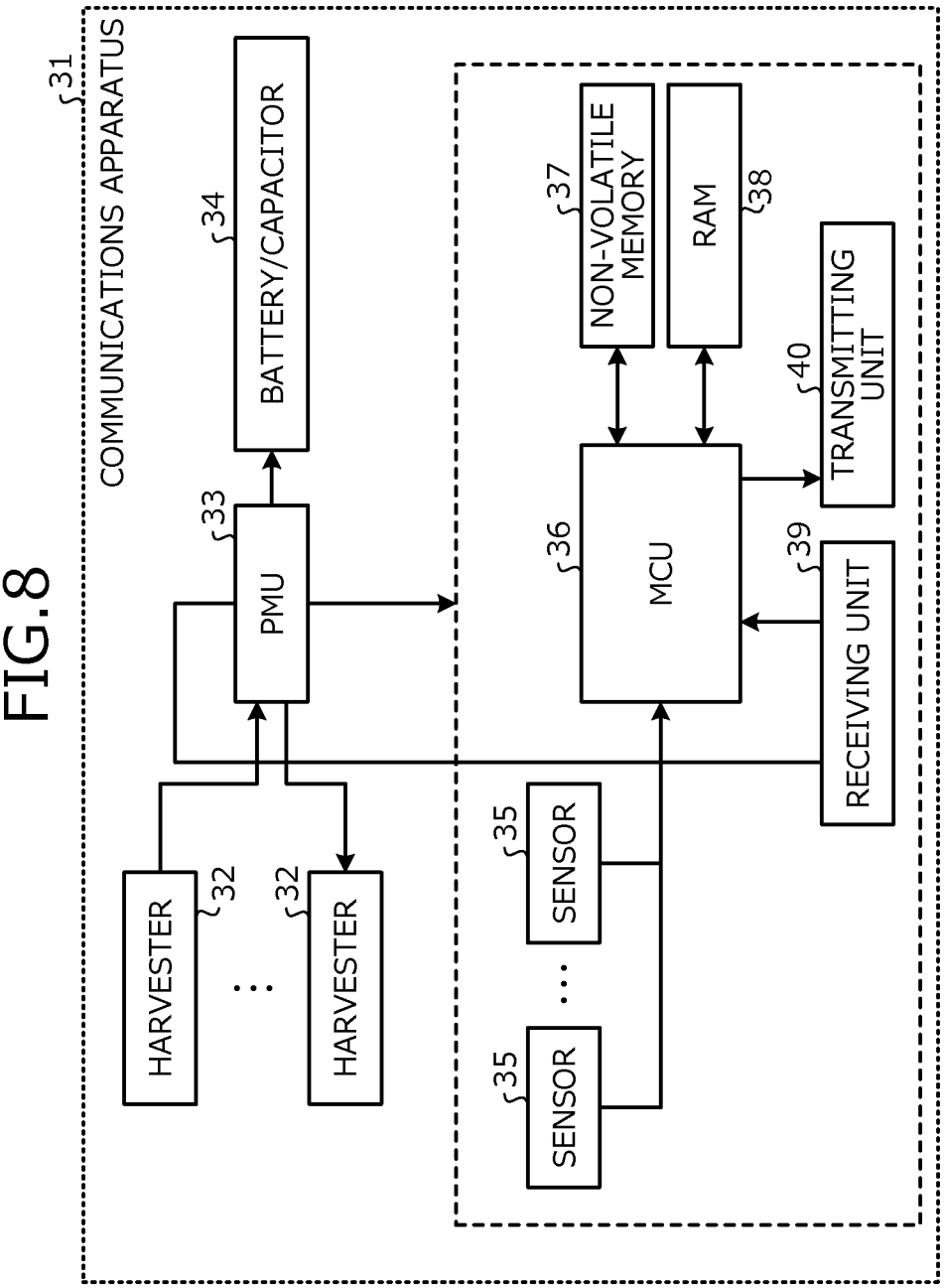
FIG. 8 is a diagram depicting an example of a hardware configuration of the communications apparatus according to the embodiment.

FIG. 8 is a diagram depicting an example of a hardware configuration of the communications apparatus according to the embodiment. In FIG. 8, an example is depicted in which the communications apparatus is applied as the sensor nodes of a sensor network. In the sensor network according to the present embodiment, plural sensor-equipped nodes are installed in an area subject to detecting by the sensors. Each node processes, as data to be transmitted, information related to detection by the sensor. Furthermore, each node broadcasts the data to be transmitted, without specifying a transmission destination. As a result, the data is transmitted to, for example, a receiver, by multi-hop communication among the nodes.

As depicted in FIG. 8, a communications apparatus 31 has one or more harvesters 32, a power management unit (PMU) 33, and a battery or a capacitor (hereinafter, battery/capacitor) 34. The harvester 32 is an example of a power generating unit. The battery/capacitor 34 is an example of a power storage unit.

The communications apparatus 31 has one or more sensors 35, microprocessor (hereinafter, micro control unit (MCU) 36, non-volatile memory 37, and random access memory (RAM) 38. The communications apparatus 31 further has a receiving unit 39 and a transmitting unit 40. The sensor 35, the MCU 36, the non-volatile memory 37, the RAM 38, the receiving unit 39, and the transmitting unit 40 may be connected by a non-depicted internal bus.

The sensor 35 detects changes of a monitored subject at the installation location and converts the detected change into an electronic signal. A piezoelectric element that detects pressure at the installation site, an element that detects temperature, a photoelectric element that detects light, and the like may be used as the sensor 35, for example. The communications apparatus 31 may have plural sensors, each detecting a different subject. The sensor 35 is an example of the first generating unit. Consequent to having the sensor 35, the communications apparatus 31 can detect changes of a monitored subject.

The MCU 36 processes data related to detection by the sensor 35. The MCU 36 executes a boot program and various types of programs that include a program that implements the communications method described hereinafter. The boot program and the various types of programs may be stored in the non-volatile memory 37, or may be stored in non-depicted read-only memory (ROM).

The non-volatile memory 37 continually stores data even when the power supply is cut. For example, the non-volatile memory 37 may store various types of information including node type, node ID, and a wait time. The RAM 38 is used as a work area of the MCU 36 and stores transient data of the processing by the MCU 36.

The receiving unit 39 and the transmitting unit 40 are connected to non-depicted antennas. The receiving unit 39 performs reception processing of radio waves received by the antenna and outputs an electronic signal to the MCU 36. The transmitting unit 40 performs transmission processing of electronic signals received from the MCU 36 and transmits radio waves from the antenna.

The harvester 32 generates electrical power based on energy changes in the external environment of the installation area of the communications apparatus 31, e.g., light, vibration, temperature, and wireless radio waves (received radio waves). The harvester 32 may generate electrical power according to displacement detected by the sensor 35.

The battery/capacitor 34 stores the electrical power generated by the harvester 32. Therefore, the communications apparatus 31 can internally generate the electrical power necessary for operation, without receiving a supply of power from a secondary battery or an external power source. The communications apparatus 31 may operate on a supply of power received from a secondary battery or an external power source, or both the electrical power generated by the harvester 32 and the power supplied from a secondary battery and/or an external power source.

The PMU 33 controls the supply of the electrical power stored by the battery/capacitor 34, to the components of the communications apparatus 31. For example, the PMU 33 may continuously supply electrical power to the sensor 35. As a result, the sensor 35 is continuously in a state enabling sensing processing. The PMU 33 may supply electrical power to the MCU 36, when the sensor 35 performs a sensing process. As a result, the MCU 36 operates, enabling processing of the data related to detection by the sensor 35. The PMU 33 may suspend the supply of electrical power to the MCU 36, if the MCU 36 is not performing any processing. By doing so, power savings of the communications apparatus 31 can be facilitated.

Figure 9:
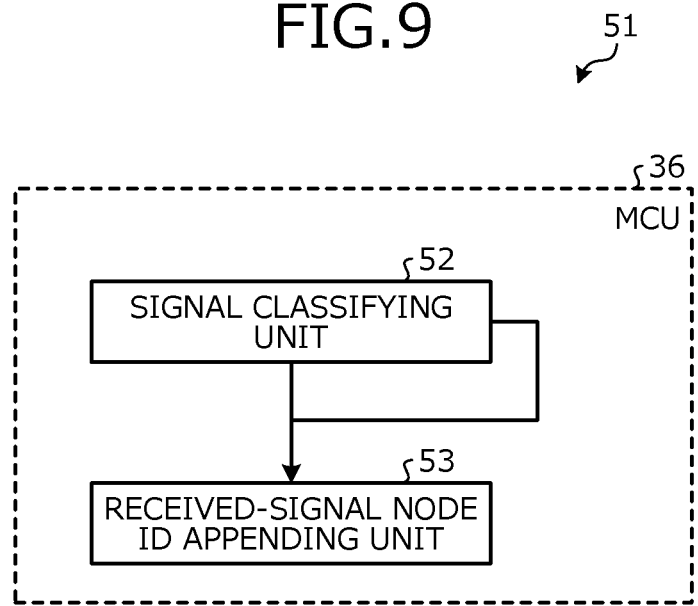
FIG. 9 is a diagram (part 1) depicting an example of a functional configuration of the communications apparatus according to the embodiment.

FIG. 9 is a diagram (part 1) depicting an example of a functional configuration of the communications apparatus according to the embodiment. The communications apparatus depicted in FIG. 9 is another example of the first communications apparatus 2 in the communications system depicted in FIG. 1 and is used as a sensor node of the sensor network. A first communications apparatus 51 depicted in FIG. 9, for example, is realized by executing on the MCU 36 in the hardware configuration depicted in FIG. 8, a program that implements the communications method described hereinafter. In a case where the hardware configuration of the first communications apparatus 51 is the configuration depicted in FIG. 8, the non-volatile memory 37 may store information including the node type thereof and the node ID thereof.

As depicted in FIG. 9, the first communications apparatus 51 has a signal classifying unit 52 and a received-signal node ID appending unit 53. The signal classifying unit 52 determines the type of the signal received by the receiving unit 39. For example, the signal classifying unit 52 may determine the signal type based on a head bit value of the signal received by the receiving unit 39.

Signal types include, for example, a calibration command signal from another node, and a sensing data signal related to detection by the sensor 35 thereof or of another node. For example, if the head bit value of a signal is 1, the signal type may be a calibration command signal from another node. For example, if the head bit value of a signal is 2, the signal type may be a sensing data signal. Examples of data formats of various types of signals will be described hereinafter.

The received-signal node ID appending unit 53 appends the node ID thereof to data that is to be transmitted. The received-signal node ID appending unit 53 is an example of the appending unit.

Figure 10:
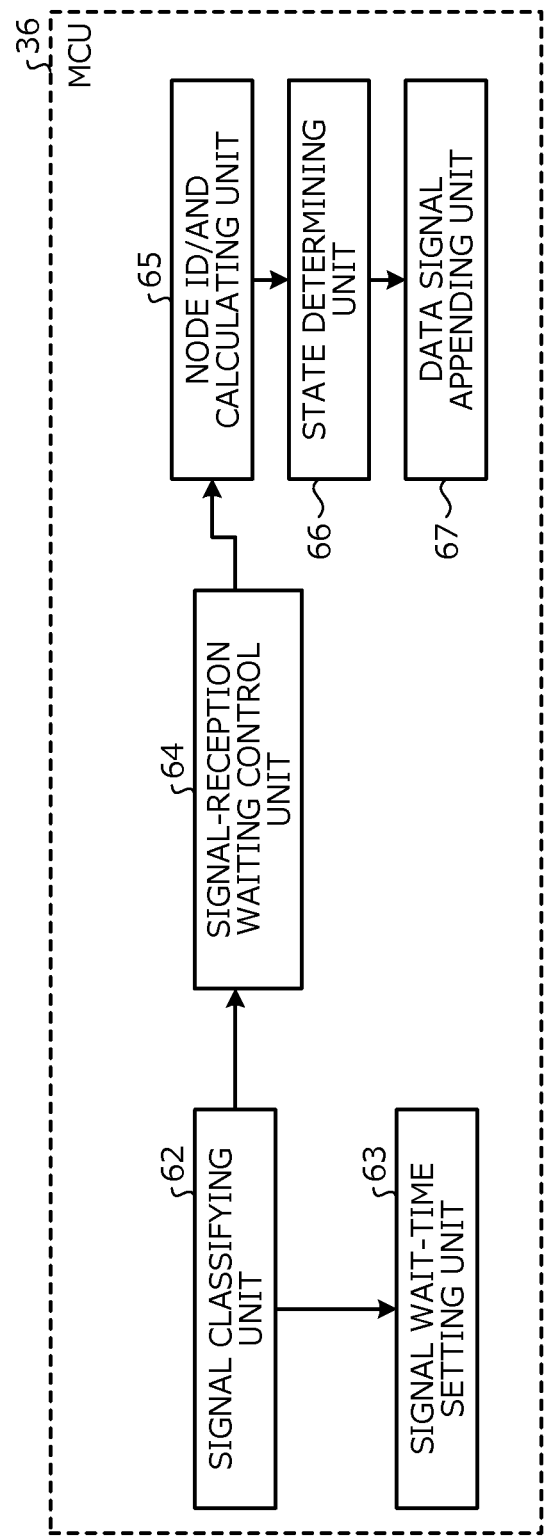
FIG. 10 is a diagram (part 2) depicting an example of a functional configuration of the communications apparatus according to the embodiment.

FIG. 10 is a diagram (part 2) depicting an example of a functional configuration of the communications apparatus according to the embodiment. The communications apparatus depicted in FIG. 10 is another example of the second communications apparatus 3 in the communications system depicted in FIG. 1 and is used as a sensor node of the sensor network. A second communications apparatus 61 depicted in FIG. 10, for example, is realized by executing on the MCU 36 in the hardware configuration depicted in FIG. 8, a program that implements the communications method described hereinafter. In a case where the hardware configuration of the second communications apparatus 61 is the configuration depicted in FIG. 8, the non-volatile memory 37 may store various types of information including the node type thereof, the node ID thereof, and a wait time.

As depicted in FIG. 10, the second communications apparatus 61 has a signal classifying unit 62, a signal wait-time setting unit 63, a signal-reception waiting control unit 64, a node ID/AND calculating unit 65, a state determining unit 66, and a data signal appending unit 67. The signal classifying unit 62 determines the type of the signal received by the receiving unit 39. For example, the signal classifying unit 62 may determine the signal type based on the head bit value of the signal received by the receiving unit 39. The signal classifying unit 62 is an example of a judging unit.

Signal types include, for example, a setting signal sent from the receiver 4 (refer to FIG. 1) to the second communications apparatus 61, which is a terminal node, and a sensing data signal related to detection by the sensor 35 thereof or of another node. For example, if the head bit value of a signal is 0, the signal type may be a setting signal sent from the receiver 4 to the second communications apparatus 61. For example, if the head bit value of a signal is 2, the signal type may be a sensing data signal. Examples of data formats of various types of signals will be described hereinafter.

The signal wait-time setting unit 63, for example, stores to the non-volatile memory 37, information of a wait time, based on information of a wait time included in a setting signal sent from the receiver 4 to the second communications apparatus 61. As a result, the period of time that the receiving unit 39 waits to receive a wireless signal is set. The signal wait-time setting unit 63 is an example of a setting unit.

The signal-reception waiting control unit 64 causes the receiving unit 39 to operate during the wait time set by the signal wait-time setting unit 63, and maintains a state enabling the receiving unit 39 to receive a wireless signal. The signal-reception waiting control unit 64 is an example of the reception control unit.

The node ID/AND calculating unit 65 determines whether the ID of a node common to plural transmission paths is present, based on the information of the transmission paths included in the wireless signals received by the receiving unit 39 during the wait time. The node ID/AND calculating unit 65, upon determining that the ID of a common node is present, extracts the ID of the common node. For example, the node ID/AND calculating unit 65 may perform an AND calculation with respect to the information of the transmission paths to thereby, extract the ID of the common node. The node ID/AND calculating unit 65 is an example of the extracting unit.

The state determining unit 66 may determine that the network is in a risky state, if the ID of a common node is extracted by the node ID/AND calculating unit 65. The state determining unit 66 may determine that the network is not in a risky state, if no ID of a common node is extracted by the node ID/AND calculating unit 65. Alternatively, the state determining unit 66, as described above, may determine the state of the network based on the appearance rate of the ID of the common node. The state determining unit 66 is an example of the determining unit.

The data signal appending unit 67 appends the ID of the common node to data that is to be transmitted and included in a wireless signal received by the receiving unit 39, in a case where the network is determined to be in a risky state by the state determining unit 66. The data signal appending unit 67 is an example of the second generating unit.

FIG. 11 is a diagram depicting an example of a data format of a setting signal sent from a receiver to the second communications apparatus. In FIG. 11, a head bit 71 indicated as "signal type", for example, is 0. Bits 72 subsequent to the head bit 71 and indicated by "wait time" store values representing the wait time in units of milliseconds. For example, if the data is "0,0x0010", the data indicates that this signal is a setting signal sent from a receiver to the second communications apparatus, and the wait time is 16 ms.

FIG. 12 is a diagram depicting an example of a data format of a calibration command signal from another node. In FIG. 12, a head bit 73 indicated as "signal type", for example, is 1. Bits 74 subsequent to the head bit 73 and indicated as "via-ID information" store, for example, the IDs of nodes passed in the sequence that the nodes are passed. For example, if the data is "1, 0x0000,0x0001, . . . ", the data indicates that this signal is a calibration command signal from another node, and the node whose ID is 0, the node whose ID is 1, . . . are passed.

FIG. 13 is a diagram depicting an example of a data format of a sensing data signal. In FIG. 13, a head bit 75 indicated as "signal type", for example, is 2. Bits 76 subsequent to the head bit 75 and indicated as "detection information" store, for example, sensing data related to detection by the sensor 35 thereof or of another node. Bits 77 indicated as "via-ID information" and subsequent to the bits 76 indicated as "detection information" store the IDs of nodes passed in the sequence that the nodes are passed. For example, if the data is "2, 0xXXXX, 0x0010,0x0033, . . . ", the data indicates that this signal is a sensing data signal, the sensing data is 0xXXXX, and the node whose ID is 16, the node whose ID is 51, . . . are passed.

FIG. 14 is a diagram (part 1) depicting another example of the communications method according to the embodiment. The communications method depicted in FIG. 14, for example, may be performed by the first communications apparatus 51 depicted in FIG. 9. In the present embodiment, description will be given in which the first communications apparatus 51 depicted in FIG. 9 performs the communications method.

As depicted in FIG. 14, in the first communications apparatus 51, if an event occurs of the sensor 35 performing a sensing process (step S21: sensing), the MCU 36 performs a boot process (step S22). The MCU 36 data processes the sensing data (step S23). The received-signal node ID appending unit 53 appends the node ID thereof to the processed sensing data (step S24). The transmitting unit 40 performs a process of transmitting, by broadcasting, transmission that includes the node ID thereof and the processed sensing data (step S25). The first communications apparatus 51 transitions to a sleep state (step S26), and ends the series of operation.

On the other hand, at the first communications apparatus 51, if an event occurs of the receiving unit 39 receiving a wireless signal (step S21: wireless signal reception), the MCU 36 performs a boot process (step S27). The signal classifying unit 52 analyzes the received signal and obtains the signal type (step S28). If the signal type is a sensing data signal from another node (step S28: data signal), the first communications apparatus 51 appends the node ID thereof to the sensing data from the other node (step S24). The transmitting unit 40 performs a process of transmitting, by broadcasting, transmission data that includes the node ID thereof and the sensing data from the other node (step S25). The first communications apparatus 51 transitions to the sleep state (step S26), and ends the series of operations.

If the signal type is a calibration command signal from another node (step S28: calibration signal from other node), the received-signal node ID appending unit 53 appends the node ID thereof (step S29). The transmitting unit 40 performs a processing transmitting, by broadcasting, transmission data that includes the node ID thereof (step S25). The first communications apparatus 51 transitions to the sleep state (step S26), and ends the series of operations.

FIG. 15 is a diagram (part 2) depicting another example of the communications method according to the embodiment. The communications method depicted in FIG. 15, for example, may be performed by the second communications apparatus 61 depicted in FIG. 10. In the present embodiment, description will be given where the second communications apparatus 61 depicted in FIG. 10 performs the communications method.

As depicted in FIG. 15, at the second communications apparatus 61, if an event occurs of the sensor 35 performing a sensing process (step S31: sensing), the MCU 36 performs a boot process (step S32). The MCU 36 data processes the sensing data (step S33). The data signal appending unit 67 appends the node ID thereof to the processed sensing data (step S34). The transmitting unit 40 performs a process of transmitting, by broadcasting, transmission data that includes the node ID thereof and the processed sensing data (step S35). The second communications apparatus 61 transitions to the sleep state (step S36), and ends the series of operations.

On the other hand, at the second communications apparatus 61, if an event occurs of the receiving unit 39 receiving a wireless signal (step S31: wireless signal reception), the MCU 36 performs a boot process (step S37). The signal classifying unit 62 analyzes the received signal and obtains the signal type (step S38). If the signal type is a sensing data signal from another node (step S38: data signal), the signal-reception waiting control unit 64, until the wait time has elapsed (step S39: NO), controls the receiving unit 39 to wait for the reception of other wireless signals.

When the wait time has elapsed (step S39: YES), the node ID/AND calculating unit 65, for example, performs an AND calculation with respect to the information of the transmission paths included in the wireless signals received by the receiving unit 39 and extracts the ID of a node common to plural transmission paths (step S40). The state determining unit 66 determines whether the ID of a node common to plural transmission paths is present, based on a calculation result obtained by the node ID/AND calculating unit 65 (step S41).

If the ID of a common node is present (step S41: YES), the state determining unit 66 determines that the network is in a risky state and notifies the data signal appending unit 67 of the ID of the common node. The data signal appending unit 67 appends the ID of the common node to the sensing data from the other node and generates transmission data that includes the sensing data and the ID of the common node (step S42).

If no ID of a common node is present (step S41: NO), the state determining unit 66 determines that the network is not in a risky state. Accordingly, the data signal appending unit 67 generates transmission data that includes the sensing data from the other node (step S43). The transmission data generated at step S43 does not include an ID of a common node.

The transmitting unit 40 performs a process of transmitting, by broadcasting, the transmission data that is generated at step S42 or at step S43 (step S35). The second communications apparatus 61 transitions to the sleep state (step S36), and ends the series of operations.

On the other hand, if the result of analysis of the received signal by the signal classifying unit 62 indicates the signal type to be a setting signal sent from a receiver to the second communications apparatus (step S38: setting signal from receiver), the MCU 36 records that the node thereof is a terminal node (step S44). For example, the MCU 36 may store to the non-volatile memory 37, data indicating the node thereof to be a terminal node and thereby records that the node thereof is a terminal node.

The signal wait-time setting unit 63 records the wait time (step S45). For example, the signal wait-time setting unit 63 may store to the non-volatile memory 37, data that indicates the wait time and thereby records the wait time. Either one of the terminal node recording process at step S44 and the wait time recording process at step S45 may be performed before the other.

The data signal appending unit 67 appends the node ID thereof (step S46). The transmitting unit 40 performs a process of transmitting, by broadcasting, transmission data that includes the node ID thereof (step S35). The second communications apparatus 61 transitions to the sleep state (step S36), and ends the series of operations.

Figure 16:
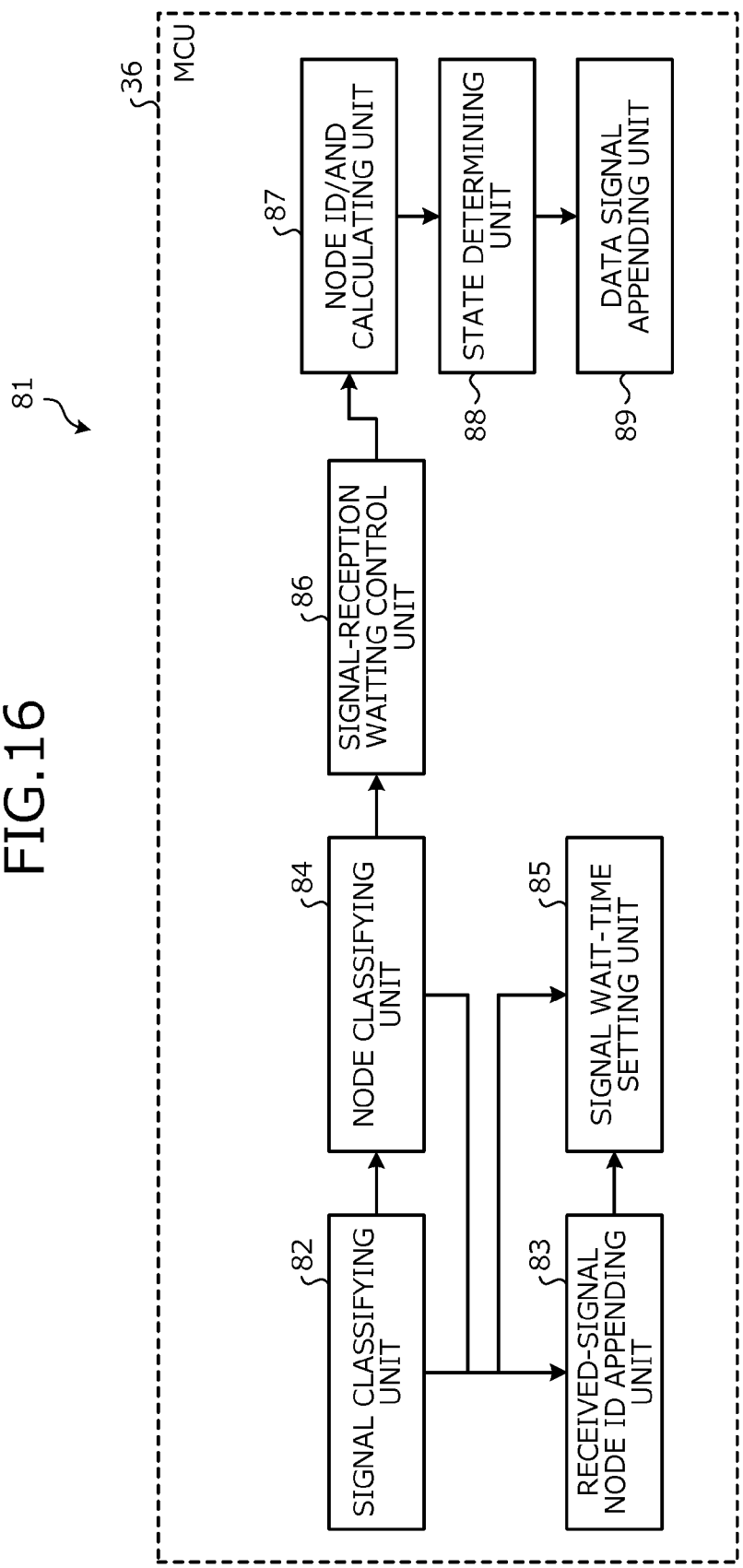
FIG. 16 is a diagram depicting another example of a functional configuration of the communications apparatus according to the embodiment.

FIG. 16 is a diagram depicting another example of a functional configuration of the communications apparatus according to the embodiment. A communications apparatus 81 depicted in FIG. 16 can be used for the first communications apparatus 2 and the second communications apparatus 3 in the communications system depicted in FIG. 1, and can be further used as a sensor node of the sensor network. The communications apparatus 81 depicted in FIG. 16, for example, is realized by executing on the MCU 36 in the hardware configuration depicted in FIG. 8, a program that implements the communications method described hereinafter. In a case where the hardware configuration of the communications apparatus 81 is the configuration depicted in FIG. 8, the non-volatile memory 37 may store information including the node type thereof, the node ID thereof, and a wait time.

As depicted in FIG. 16, the communications apparatus 81 has a signal classifying unit 82, a received-signal node ID appending unit 83, a node classifying unit 84, a signal wait-time setting unit 85, a signal-reception waiting control unit 86, a node ID/AND calculating unit 87, a state determining unit 88, and a data signal appending unit 89.

The signal classifying unit 82 determines the type of the signal received by the receiving unit 39. For example, the signal classifying unit 82 may determine the signal type based on a head bit value of the signal received by the receiving unit 39. The signal classifying unit 82 is an example of the judging unit.

Signal types include, for example, a setting signal sent from the receiver 4 (refer to FIG. 1) to the communications apparatus 81, when the communications apparatus 81 is a terminal node; a calibration command signal sent from another node, when the communications apparatus 81 is not a terminal node; and a sensing data signal related to detection by the sensor 35 thereof or of another node.

For example, if the head bit value of a signal is 0, the signal type may be a setting signal sent from the receiver 4 to the communications apparatus 81, which is a terminal node. For example, if the head bit value of a signal is 1, the signal type may be a calibration command signal from another node. For example, if the head bit value of a signal is 2, the signal type may be a sensing data signal. Examples of data formats of various types of signals are described above.

The received-signal node ID appending unit 83 is an example of the appending unit and for example, is the same as the received-signal node ID appending unit 53 in the first communications apparatus 51 depicted in FIG. 9 and therefore, redundant description thereof is omitted herein.

The node classifying unit 84 determines whether the node thereof is a terminal node. The node classifying unit 84, for example, may determine that the node thereof is a terminal node when data indicating that the node thereof is a terminal node is stored in the non-volatile memory 37; and may determine that the node thereof is not a terminal node when data indicating that the node thereof is a terminal node is not stored in the non-volatile memory 37.

The signal wait-time setting unit 85 is an example of the setting unit and, for example, is the same as the signal wait-time setting unit 63 in the second communications apparatus 61 depicted in FIG. 10 and therefore, redundant description thereof is omitted herein.

The signal-reception waiting control unit 86 is an example of the reception control unit and, for example, is the same as the signal-reception waiting control unit 64 in the second communications apparatus 61 depicted in FIG. 10 and therefore, redundant description thereof is omitted herein.

The node ID/AND calculating unit 87 is an example of the extracting unit and, for example, is the same as the node ID/AND calculating unit 65 in the second communications apparatus 61 depicted in FIG. 10 and therefore, redundant description thereof is omitted herein.

The state determining unit 88 is an example of the determining unit and, for example, is the same as the state determining unit 66 in the second communications apparatus 61 depicted in FIG. 10 and therefore, redundant description thereof is omitted herein.

The data signal appending unit 89 is an example of the second generating unit and, for example, is the same as the data signal appending unit 67 in the second communications apparatus 61 depicted in FIG. 10 and therefore, redundant description thereof is omitted herein.

Figure 17:
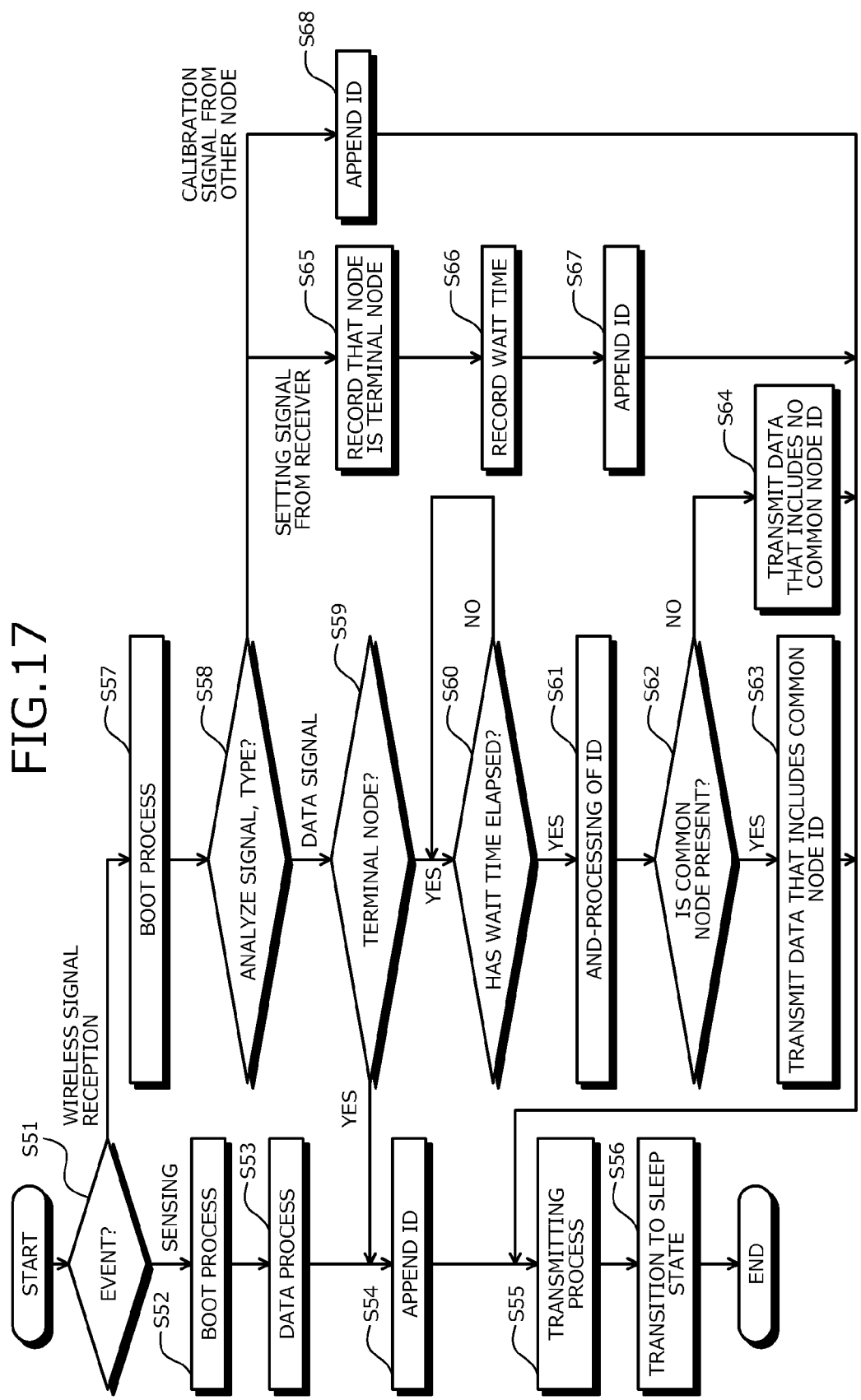
FIG. 17 is a diagram (part 3) depicting another example of the communications method according to the embodiment.

FIG. 17 is a diagram (part 3) depicting another example of the communications method according to the embodiment. The communications method depicted in FIG. 17, for example, may be performed by the communications apparatus 81 depicted in FIG. 16. In the present embodiment, description will be given where the communications apparatus 81 depicted in FIG. 16 performs the communications method.

As depicted in FIG. 17, at the communications apparatus 81, if an event occurs of the sensor 35 performing a sensing process (step S51: sensing), the MCU 36 performs a boot process (step S52). The MCU 36 data processes the sensing data (step S53).

If the node thereof is not a terminal node, the received-signal node ID appending unit 83 appends the node ID thereof to the processed sensing data. If the node thereof is a terminal node, the data signal appending unit 89 appends the node ID thereof to the processed sensing data (step S54).

The transmitting unit 40 performs a process of transmitting, by broadcasting, transmission data that includes the node ID thereof and the processed sensing data (step S55). The communications apparatus 81 transitions to the sleep state (step S56), and ends the series of operations.

On the other hand, at the communications apparatus 81, if an event occurs of the receiving unit 39 receiving a wireless signal (step S51: wireless signal reception), the MCU 36 performs a boot process (step S57). The signal classifying unit 82 analyzes the received signal and obtains the signal type (step S58). If the signal type is a sensing data signal from another node (step S58: data signal), the node classifying unit 84 determines whether the node thereof is a terminal node (step S59).

If the node thereof is not a terminal node (step S59: NO), the received-signal node ID appending unit 83 appends the node ID thereof to the processed sensing data (step S54). The transmitting unit 40 performs a process of transmitting, by broadcasting, transmission data that includes the node ID thereof and the processed sensing data (step S55). The communications apparatus 81 transitions to the sleep state (step S56), and ends the series of operations.

If the node thereof is a terminal node (step S59: YES), the signal-reception waiting control unit 86, until the wait time has elapsed (step S60: NO), controls the receiving unit 39 to wait for the reception of other wireless signals.

When wait time has elapsed (step S60: YES), the node ID/AND calculating unit 87, for example, performs an ADD calculation with respect to the information of the transmission paths included in the wireless signals received by the receiving unit 39 and extracts the ID of a node common to plural transmission paths (step S61). The state determining unit 88 determines whether the ID of a node common to plural transmission paths is present, based on a calculation result obtained by the node ID/AND calculating unit 87 (step S62).

If the ID of a common node is present (step S62: YES), the state determining unit 88 determines that the network is in a risky state and notifies the data signal appending unit 89 of the ID of the common node. The data signal appending unit 89 appends the ID of the common node to the sensing data from the other node and generates transmission data that includes the sensing data and the ID of the common node (step S63).

If no ID of a common node is present (step S62: NO), the state determining unit 88 determines that the network is not in a risky state. Accordingly, the data signal appending unit 89 generates transmission data that includes the sensing data from the other node (step S64). The transmission data generated at step S64 does not include an ID of a common node.

The transmitting unit 40 performs a process of transmitting, by broadcasting, the transmission data generated at step S63 or at step S64 (step S55). The communications apparatus 81 transitions to the sleep state (step S56), and ends the series of operations.

On the other hand, if the result of analysis of the received signal by the signal classifying unit 82 indicates the signal type to be a setting signal sent from a receiver to the communications apparatus 81, which is a terminal node (step S58: setting signal from receiver), the MCU 36 records that the node thereof is a terminal node (step S65). For example, the MCU 36 may store to the non-volatile memory 37, data indicating the node thereof to be a terminal node and thereby records that the node thereof is a terminal node.

The signal wait-time setting unit 85 records the wait time (step S66). For example, the signal wait-time setting unit 85 may store to the non-volatile memory 37, data that indicates the wait time and thereby records the wait time. Either one of the terminal node recording process at step S65 and the wait time recording process at step S66 may be performed before the other.

The data signal appending unit 89 appends the node ID thereof (step S67). The transmitting unit 40 performs a process of transmitting, by broadcasting, transmission data that includes the node ID thereof (step S55). The communications apparatus 81 transitions to the sleep state (step S56), and ends the series of operations.

On the other hand, if the result of analysis of the received signal by the signal classifying unit 82 indicates the signal to be a calibration command signal from another node (step S58: calibration signal from other node), the received-signal node ID appending unit 83 appends the node ID thereof (step S68). The transmitting unit 40 performs a process of transmitting, by broadcasting, transmission data that includes the node ID thereof (step S55). The communications apparatus 81 transitions to the sleep state (step S56), and ends the series of operations.

Figure 18:
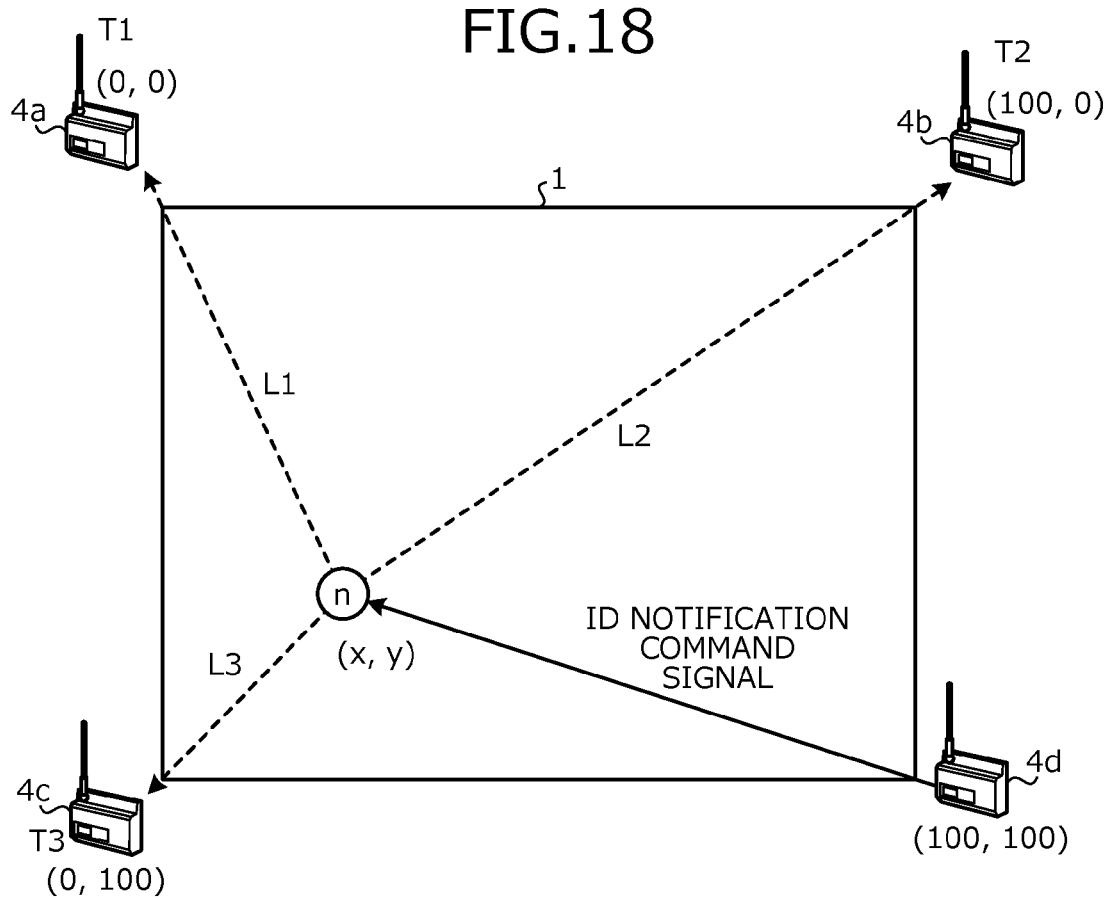
FIG. 18 is a diagram depicting an example of a method of identifying the position of a node.

FIG. 18 is a diagram depicting an example of a method of identifying the position of a node. As depicted in FIG. 18, for example, the receivers 4a, 4b, 4c, and 4d whose positions are known are arranged within a range of the area 1. The coordinates of the first receiver 4a are, for example, (0, 0); the coordinates of the second receiver 4b are, for example, (100, 0); and the coordinates of the third receiver 4c are, for example, (0, 100). The first receiver 4a, the second receiver 4b, and the third receiver 4c are examples of a third communications apparatus. The coordinates of the fourth receiver 4d are, for example, (100, 100). The coordinates of a node in the area 1 and whose ID is n are represented by (x, y), where n is an integer of 0 or greater.

When calibration to identify the positions of nodes in the area 1 is performed, the fourth receiver 4d issues a command signal that instructs the nodes in the area 1 to give notification of the ID thereof. Each of nodes in the area 1, upon receiving the command signal for ID notification, broadcasts to the other nodes, a data signal that includes the node ID thereof. Each of the other nodes in the area 1, upon receiving the broadcasted signal, appends the node ID thereof to the data, and broadcasts a data signal to the other nodes. In this manner, the nodes in the area 1 repeatedly perform ad hoc communication thereamong.

The time consumed for the ID from the node whose ID is n to reach the first receiver 4a is assumed to be T1. The time consumed for the ID of the node whose ID is n to reach the second receiver 4b is assumed to be T2. The time consumed for the ID of the node whose ID is n to reach the third receiver 4c is assumed to be T3. The distance from the node whose ID is n to the first receiver 4a is assumed to be L1. The distance from the node whose ID is n to the second receiver 4b is assumed to be L2. The distance from the node whose ID n to the third receiver 4c is assumed to be L3.

The receivers 4a, 4b, 4c, and 4d, for example, may be connected by cable or wirelessly to a non-depicted server. The first receiver 4a may notify the server of the time at which the command signal for ID notification is issued. The second receiver 4b, the third receiver 4c, and the fourth receiver 4d may respectively notify the server of the times T1, T2, and T3 when the IDs from other nodes in the area 1 are received. The server may store the coordinates of the second receiver 4b, the third receiver 4c, and the fourth receiver 4d.

The server, for example, calculates equations (1), (2), and (3), where, t is the time consumed for one hop between nodes; and d is the density of the nodes in the area 1. Based on equations (1) to (3), the coordinates (x, y) of the node whose ID is n can be identified.

$$|L2 - L1| = \sqrt{\frac{|T2 - T1|}{t \times d}} \quad (1)$$

$$|L3 - L1| = \sqrt{\frac{|T3 - T1|}{t \times d}} \quad (2)$$

$$|L3 - L2| = \sqrt{\frac{|T3 - T2|}{t \times d}} \quad (3)$$

According to the communications apparatus depicted in FIG. 9 or the communications method depicted in FIG. 14, in the sensor network, each time sensing data is generated or relayed, the ID of the sensor node is appended to the information of the transmission path. Therefore, the ID of the node that relays the sensing data, for example, can be provided to a node that determines based on the information of the transmission path, whether the network is in a risky state. For example, the information of the transmission path is provided to the terminal node depicted FIG. 10 and the terminal node depicted in FIG. 10 determines based on the information of the transmission path, whether the network is in a risky state, whereby it can be detected that the transmission paths in the sensor network are in a risky state.

According to the communications apparatus depicted in FIG. 10 or the communications method depicted in FIG. 15, the information of the transmission path of the sensing data includes the IDs of the nodes that relayed the sensing data, whereby the ID of a common node can be extracted from the information of the transmission paths of the sensing data. Based on whether an ID of a common node is present, whether the network is in a risky state can be determined. Therefore, it can be detected that the transmission paths in the sensor network are is in a risky state.

According to the communications apparatus depicted in FIG. 16 or the communications method depicted in FIG. 17, it can be detected that the transmission paths in the sensor network are in a risky state. Further, the same communications apparatus 81 can be used as either a terminal node or a non-terminal node. Therefore, a communications apparatus for a terminal node and a communications apparatus for a non-terminal node need not be separately manufactured.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications apparatus comprising:
a reception signal processor that receives a wireless signal;
a processor that:
controls a wait time that the reception signal processor waits for reception of a plurality of wireless signals that include data to be transmitted and information of transmission paths;
extracts from the information of the transmission paths included in the plurality of wireless signals received by the reception signal processor during the wait time, information of a common relay point in the transmission paths;

determines a network state according to a ratio of transmission paths that include the common relay point, among a total count of the transmission paths; and generates based on the determined network state, a signal that includes information of a relay point; and a transmission signal processor that transmits the generated signal.

2. The communications apparatus according to claim 1, wherein the information of the transmission paths includes unique information of the relay point that relays the data by ad hoc communication with other communications apparatuses.

3. The communications apparatus according to claim 1, wherein the wait time is a period based on a difference of distances of the transmission paths.

4. The communications apparatus according to claim 1, wherein the processor determines the network state to be risky when the ratio is a threshold or greater.

5. The communications apparatus according to claim 1, wherein the processor further:

judges whether the wireless signal received by the reception signal processor is a wireless signal that includes the data and information of a transmission path, or a wireless signal that includes information of the wait time; and sets the wait time based on the information of the wait time, upon judging that the wireless signal received by the reception signal processor is the wireless signal that includes the information of the wait time.

6. The communications apparatus according to claim 1, further comprising:

a plurality of second communications apparatuses that each includes:

a sensor that generates data to be transmitted;

a second reception signal processor that receives a wireless signal;

a second processor that when the sensor generates the data, appends unique information of the second communications apparatus thereof to the generated data, and when the second reception signal processor receives the wireless signal that includes data to be transmitted and information of a transmission path, appends the unique information thereof to the information of the transmission path; and a second transmission signal processor that transmits a signal to which the second processor appended the unique information thereof, wherein each second communications apparatus appends the unique information thereof to the data and by ad hoc communication, transmits the data to any one among another second communications apparatus among the plurality of second communications apparatuses and the communications apparatus, and the communications apparatus receives from one or more of the plurality of second communications apparatuses and by the ad hoc communication, the data and the information of the transmission path, and determines the network state according to the ratio of the transmission paths that include the common relay point, among the total count of the transmission paths.

7. The communications apparatus according to claim 6, wherein the information of the transmission path includes unique information of a relay point that relays the data by ad hoc communication with other communications apparatuses.

8. The communications apparatus according to claim 6, further comprising a second sensor that converts a change of a monitored subject into an electronic signal.

9. The communications apparatus according to claim 6, wherein the sensor converts a change of a monitored subject into an electronic signal.

10. The communications apparatus according to claim 6, further comprising:

a harvester that generates electrical power; and a battery/capacitor that stores the electrical power generated by the harvester, wherein the communications apparatus operates on any one among the electrical power generated by the harvester and the electrical power stored by the battery/capacitor.

11. The communications apparatus according to claim 6, further comprising:

a harvester that generates electrical power; and a battery/capacitor that stores the electrical power generated by the harvester, wherein the communications apparatus operates on any one among the electrical power generated by the harvester and the electrical power stored by the battery/capacitor.

* * * * *